Nov. 2, 1948.
H. B. SMITH
2,452,797
STRIPPING OF ACETALDEHYDE FROM
ALDOL BY HYDROCARBON VAPORS
Filed May 29, 1944
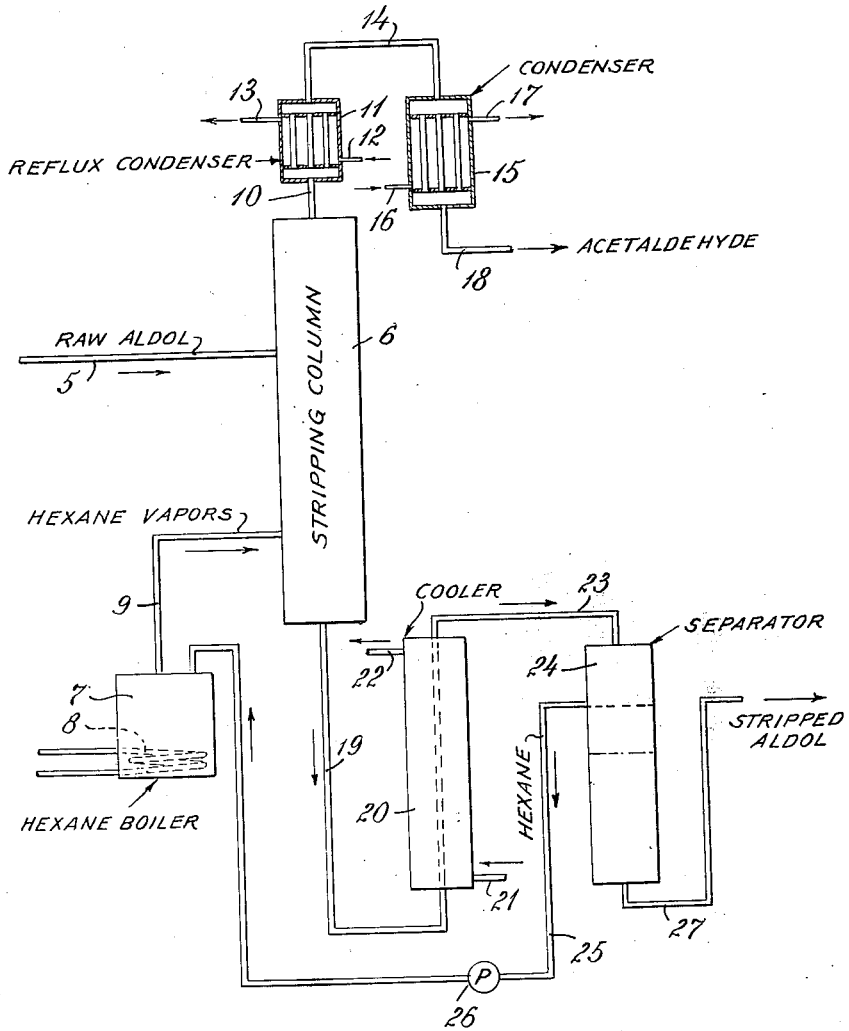
INVENTOR
Henry B. Smith
BY
Pennie Davis Marvin & Edmonds
ATTORNEYS Patented Nov. 2, 1948

2,452,797

UNITED STATES PATENT OFFICE 2,452,797

STRIPPING OF ACETALDEHYDE FROM ALDOL BY HYDROCARBON VAPORS

Henry B. Smith, Baltimore, Md., assignor, by mesne assignments, to U. S. Industrial Chemicals, Inc., a corporation of Delaware Application May 29, 1944, Serial No. 537,877

7 Claims. (Cl. 202—46)

This invention relates to an improvement in the preparation of aldol and particularly to an improved method for the continuous separation of unreacted acetaldehyde from crude aldol.

In the preparation of aldol by the condensation of acetaldehyde, it is customary to conduct the reaction so that substantial amounts of acetaldehyde remain unconverted and in recoverable form. The crude aldol product is, therefore, a mixture containing aldol, acetaldehyde and the condensation catalyst, together with water which may have been added with the condensation catalyst or by dilution of the acetaldehyde.

When the aldol is to be subjected to further chemical reaction, for example in the hydrogenation of aldol to produce 1,3-butylene glycol, which in turn may be dehydrated to 1,3-butadiene, the presence of unreacted acetaldehyde is undesirable and its removal becomes an essential step in such a process. The acetaldehyde is undesirable because during the hydrogenation of aldol it will be hydrogenated to ethyl alcohol, thus reducing the overall economy of the aldol preparation. Furthermore, the hydrogenation of acetaldehyde liberates a considerable amount of heat which is undesirable since it necessitates provision for greater cooling and may at times cause an undesirable temperature rise or introduce secondary reactions.

It has been customary heretofore, wherever such removal of acetaldehyde is contemplated, to use methods whereby both the water present in the crude aldol as well as the unchanged acetaldehyde are removed. Such procedure results in the preparation of highly concentrated aldol which, due to its tendency toward polymerization, forms paraldol, a solid having a melting point of about 82° C. Where the aldol so purified does not form a solid phase, there results a very viscous solution, presumably of paraldol dissolved in aldol. Such viscous solutions or solids are difficult to handle in the ensuing steps such as hydrogenation, for example, and it is usually necessary to add water to the concentrated aldol in order to make it more fluid so that it may be readily pumped, as for example into a continuous hydrogenation apparatus.

There are further disadvantages occuring when both acetaldehyde and water are removed from crude aldol. If steam, at or above atmospheric pressure, is used to effect such removal, the crude aldol is subjected to a higher temperature than is desirable, and as a result there may be accompanying dehydration of the aldol to form crotonaldehyde in substantial amounts. The crotonaldehyde formed represents a loss of acetaldehyde and results, therefore, in a decreased yield of aldol from the acetaldehyde. In addition to crotonaldehyde, there is generally a production of higher boiling impurities.

To avoid subjecting the crude aldol to an unduly high temperature, resort is generally had to the removal of the acetaldehyde under reduced pressure. This operation is more costly due to the power requirements for the production of the reduced pressure, and has the further disadvantage that complete and economical recovery of the low boiling acetaldehyde in such operation is difficult to achieve.

It is the object of the present invention to avoid the difficulties mentioned and to afford a simple, economical and effective method of separating and recovering acetaldehyde from crude aldol.

Other objects and advantages of the invention will be understood by reference to the following specification and accompanying drawing illustrating diagrammatically an apparatus suitable for the practice of the method.

I have discovered that it is possible to remove the unreacted acetaldehyde from crude aldol at normal atmospheric pressures and in such a manner that the aldol is at no time subjected to temperatures sufficiently elevated to cause dehydration of the aldol or formation of other undesirable products. The method permits continuous removal of acetaldehyde from crude aldol and is characterized by the use as a stripping agent of the vapor of an organic compound having certain necessary characteristics. These are insolubility in aldol, inability to form azeotropes with acetaldehyde or acetaldehyde and water, boiling beow the boiling point of acetaldehyde (21° C.), a boiling point low enough to avoid overheating of the aldol and a density which permits ready separation of the condensed organic compound from the aldol by gravity. In general the boiling point of the compound used should be between 50° and 85° C., since higher temperatures are likely to result in overheating of the aldol. Numerous organic compounds fulfil the requirements, but I prefer to employ saturated hydrocarbons having five or six carbon atoms such as hexane (petroleum naphtha having a boiling point of 67° C.). Cyclohexane having a boiling point of 81° C. may be used. Isohexane—boiling point 60.2° C., cyclopentane—boiling point 49.5° C., and methyl cyclopentane—boiling point 71.8° C. are also usable.

By boiling the compound having the characteristics mentioned and contacting the raw aldol with the vapor therefrom, I can effect complete separation of the acetaldehyde as vapor which may be subsequently condensed. The liquid effluent from the stripping operation includes the condensed vapors of the selected compound together with the aldol and the water present therein. These are readily separated by gravity into two layers. The liquid compound may be withdrawn and returned to the boiler so that the vapors may be utilized again in the distillation. The stripped aldol can be withdrawn separately and utilized for its intended purpose. The stripped aldol is a limpid liquid showing no tendency to crystallize at ordinary temperatures or to become so viscous as to impair the ease with which it may be pumped or otherwise handled. It is also free from appreciable amounts of crotonaldehyde and/or high boilers and is well adapted for hydrogenation to 1,3-butylene glycol with good yields.

As an additional precaution to avoid side reactions tending to produce crotonaldehyde, resinous products and other undesirable properties, I prefer to neutralize the crude aldol to a point between pH 5.0 and pH 7.0 and preferably between pH 6.0 and pH 7.0, before stripping. Any suitable neutralizing agent may be employed for this purpose, for example an acid such as sulphuric, hydrochloric or acetic.

Referring to the drawing, crude aldol may be introduced through a pipe 5 to a stripping tower 6 which may be provided with the usual bubble caps or may be packed with rings or other devices to afford maximum surface contact of the liquid with the vapors in the tower. The selected organic liquid, for example hexane, is supplied to a boiler 7 heated for example by means of a steam coil 8. The vapors escape through a pipe 9 to the tower 6 and pass upwardly in contact with the crude aldol flowing downwardly through the tower. The effluent vapors are withdrawn through a pipe 10 and delivered to a reflux condenser 11 through which water is circulated by means of pipes 12 and 13. This serves to condense any vapors other than those of acetaldehyde, the condensate being returned through the pipe 10 to the column. The remaining vapors pass through a pipe 14 to a condenser 15 cooled by water circulated through pipes 16 and 17. The condensate, consisting of acetaldehyde, is withdrawn through a pipe 18 and delivered to a storage receptacle. The acetaldehyde may be returned for further reaction to produce aldol.

The liquid product of the distillation leaves the bottom of the tower 6 through a pipe 19 and passes through a cooler 20 through which water is circulated by means of pipes 21 and 22. The cooled liquid passes through a pipe 23 to a separator 24 where it readily settles in two layers, the upper of which is the liquid hexane which is withdrawn through a pipe 25 and pump 26 and returned to the boiler 7 for further use. The stripped aldol is withdrawn through a pipe 27 and delivered to a suitable storage receptacle. The aldol may be subjected to hydrogenation to produce 1,3-butylene glycol. It contains a small amount of water which does not affect the hydrogenation. It may also contain traces of hexane. If such traces are undesirable in view of any specific use of the aldol, they will be eliminated readily by heating under vacuum or by passing an inert gas through the aldol while it is heated to a low temperature.

The distillation of the acetaldehyde from the crude aldol in the tower 6 may be carried out over a wide temperature range, but it has been found especially advantageous to operate between about 50° and 85° C. At temperatures substantially above 85° C., there is danger of the formation of crotonaldehyde and/or high boiling products. At temperatures much below 50° C., the removal of acetaldehyde becomes slower, and it is generally not commercially feasible to operate at such low temperatures.

Among the advantages of the procedure as described are the avoidance of any temperature higher than that of the boiling point of the vapor employed, the recovery of the acetaldehyde in concentrated form, avoidance of difficulties attendant upon scrubbing of acetaldehyde from dilute gaseous solution, and elimination of the necessity for reducing pressure in order to avoid decomposition temperatures. Suitable stripping agents are readily available and afford in the simple manner described a practicable procedure for the elimination of acetaldehyde from aldol.

This application is a continuation in part of my application Serial No. 495,719 filed July 22, 1943 (now abandoned).

Various changes may be made in the method as described and in the apparatus employed without departing from the invention or sacrificing the advantages thereof.

I claim:

1. The method of separating acetaldehyde from an aqueous mixture containing acetaldehyde and aldol, which comprises introducing such aqueous mixture into a stripping zone, contacting such mixture therein with hexane vapor to vaporize the acetaldehyde, the hexane vapor being simultaneously condensed, withdrawing the resulting vapors as the overhead from the stripping zone, partially condensing such vapors to produce an overhead consisting substantially only of acetaldehyde vapor, and returning the resulting condensate to the stripping zone.

2. The method of separating acetaldehyde from an aqueous mixture containing acetaldehyde and aldol, which comprises introducing such aqueous mixture into a stripping zone, contacting such mixture therein with cyclohexane vapor to vaporize the acetaldehyde, the cyclohexane vapor being simultaneously condensed, withdrawing the resulting vapors as the overhead from the stripping zone, partially condensing such vapors to produce an overhead consistng substantially only of acetaldehyde vapor, and returning the resulting condensate to the stripping zone.

3. The method of separating acetaldehyde from an aqueous mixture containing acetaldehyde and aldol, which comprises introducing such aqueous mixture into the stripping zone, contacting such mixture therein with hexane vapor to vaporize the acetaldehyde, the hexane vapor being simultaneously condensed, withdrawing the resulting vapors as the overhead from the stripping zone, partially condensing such vapors to produce an overhead consisting substantially only of acetaldehyde vapor, returning the resulting condensate to the stripping zone, withdrawing the condensed hexane and the stripped aqueous aldol as the bottoms from the stripping zone, separating the condensed hexane from the stripped aldol by gravity, and vaporizing the separated hexane for reuse in the stripping zone.

4. The method of separating acetaldehyde from an aqueous mixture containing acetaldehyde and aldol, which comprises introducing such aqueous mixture into a stripping zone, contacting such mixture therein with cyclohexane vapor to vaporize the acetaldehyde, the cyclohexane vapor being simultaneously condensed, withdrawing the resulting vapors as the overhead from the stripping zone, partially condensing such vapors to produce an overhead consisting substantially only of acetaldehyde vapor, returning the resulting condensate to the stripping zone, withdrawing the condensed cyclohexane and the stripped aqueous aldol as the bottoms from the stripping zone, separating the condensed cyclohexane from the stripped aldol by gravity, and vaporizing the separated cyclohexane for reuse in the stripping zone.

5. The method of separating acetaldehyde from an aqueous mixture containing acetaldehyde and aldol, which comprises neutralizing the aqueous mixture to a pH within the range of 5.0 to 7.0, introducing the neutralized aqueous mixture into a stripping zone, contacting such mixture therein with hexane vapor to vaporize the acetaldehyde, the hexane vapor being simultaneously condensed, withdrawing the resulting vapors as the overhead from the stripping zone, partially condensing such vapors to produce an overhead consisting substantially only of acetaldehyde vapor, and returning the resulting condensate to the stripping zone.

6. The method of separating acetaldehyde from an aqueous mixture containing acetaldehyde and aldol, which comprises neutralizing the aqueous mixture to a pH within the range of 5.0 to 7.0, introducing the neutralized aqueous mixture into a stripping zone, contacting such mixture therein with cyclohexane vapor to vaporize the acetaldehyde, the cyclohexane vapor being simultaneously condensed, withdrawing the resulting vapors as the overhead from the stripping zone, partially condensing such vapors to produce an overhead consisting substantially only of acetaldehyde vapor, and returning the resulting condensate to the stripping zone.

7. The method of separating acetaldehyde from an aqueous mixture containing acetaldehyde and aldol, which comprises introducing such aqueous mixture into a stripping zone, contacting such mixture therein with the vapor of a hydrocarbon selected from the group consisting of saturated aliphatic and alicyclic hydrocarbons having from 5 to 6 carbon atoms to vaporize the acetaldehyde, the vapor of the hydrocarbon being simultaneously condensed, said hydrocarbon being insoluble in aldol, not forming an azeotrope with acetaldehyde or with acetaldehyde and water boiling below the boiling point of acetaldehyde, having a boiling point between 50 and 85° C., and having a density permitting separation thereof from aldol by gravity, withdrawing the resulting vapors as the overhead from the stripping zone, partially condensing such vapors to produce an overhead consisting substantially only of acetaldehyde vapor, and returning the resulting condensate to the stripping zone.

HENRY B. SMITH.

REFERENCES CITED

The following references are of record in the file of this patent:

UNITED STATES PATENTS

| Number | Name | Date |
| --- | --- | --- |
| 1,885,242 | Durrans | Nov. 1, 1932 |
| 2,000,043 | Shiffler | May 7, 1935 |
| 2,170,854 | Drake | Aug. 29, 1939 |
| 2,251,081 | Taylor et al. | July 29, 1941 |
| 2,259,951 | Eversole | Oct. 21, 1941 |
| 2,368,904 | Tuerck et al. | Feb. 6, 1945 |
| 2,372,540 | Balcar | Mar. 27, 1945 |

FOREIGN PATENTS

| Number | Country | Date |
| --- | --- | --- |
| 22,621 | Great Britain | 1912 |